US006370275B1

(12) United States Patent
Benoit et al.

(10) Patent No.: US 6,370,275 B1
(45) Date of Patent: Apr. 9, 2002

(54) PROCESS AND DEVICE FOR SCANNING A PLASMA PANEL

(75) Inventors: Eric Benoit, Eybens; Didier Doyen, La Bouexière, both of (FR)

(73) Assignee: Thomson multimedia, Boulogne (FR)

( * ) Notice: Subject to any disclaimer, the term of this patent is extended or adjusted under 35 U.S.C. 154(b) by 0 days.

(21) Appl. No.: 09/166,464

(22) Filed: Oct. 5, 1998

(30) Foreign Application Priority Data

Oct. 9, 1997 (FR) ........................................... 97 12602

(51) Int. Cl.[7] ............................ G06K 9/46; G09G 3/28

(52) U.S. Cl. ......................................... 382/237; 345/60

(58) Field of Search ................................ 382/232, 237, 382/168, 169, 270; 345/60, 63, 68, 215, 89; 348/798; 315/169.4

(56) References Cited

U.S. PATENT DOCUMENTS 3,979,638 A * 9/1976 Ngo ........................... 345/215
4,006,298 A * 2/1977 Fowler et al. .............. 348/798
4,695,838 A * 9/1987 Ellis, Jr. ...................... 345/68
5,343,215 A * 8/1994 Tanaka ........................ 345/63
5,475,448 A * 12/1995 Saegusa ...................... 348/797
5,742,265 A * 4/1998 Stoller et al. ................. 345/60
5,805,126 A * 9/1998 Bassetti ....................... 345/89

FOREIGN PATENT DOCUMENTS

EP 0707302 4/1996 ............ G09G/3/28
JP 6-259034 4/1994 ............ G09G/3/20

OTHER PUBLICATIONS

Patent Abstracts of Japan, vol. 18, No. 659 Dec. 13, 1994 & JP 6–259034.

* cited by examiner

*Primary Examiner*—Wenpeng Chen
(74) *Attorney, Agent, or Firm*—Joseph S. Tripoli; Harvey D. Fried; Sammy S. Henig

(57) ABSTRACT

The invention relates to a process and device for scanning cells of a matrix-controlled display for the displaying of grey levels of a video signal, the scan being split up into sub-scans relating to each bit of column control words, characterized in that, when the coding of image does not activate the high-order bit, the processing sub-scan relating to this bit is allocated to the displaying of an additional item which corresponds to a bit of lower weight than the smallest weight of the column control word used when the condition is not fulfilled. The applications of the invention relate to matrix-controlled display devices using the principle of temporal modulation for the generation of halftones, especially plasma panels of the a.c. type with memory or d.c. type with memory.

18 Claims, 3 Drawing Sheets

PROCESS AND DEVICE FOR SCANNING A PLASMA PANEL

FIELD OF THE INVENTION

The invention relates to a plasma panel scanning process adapted to the contents of the video image to be displayed and its associated device.

BACKGROUND OF THE INVENTION

An elementary cell of a plasma panel can have only two states: unlit and lit. It is known that, since analogue modulation of the amount of light emitted by a pixel is not possible, half-tones are generated by temporal modulation of the duration of emission of the pixel in the image period T. This image period consists of as many sub-periods (To, 2To, . . . , $2^{n-1}$To) which are multiples of a value To, as there are bits for coding the video (n bits). On the basis of the n sub-periods it is possible, by combination, to reconstruct $2^n$ different grey levels of linearly distributed luminance:

$$0\cdot L_{max};\ \frac{1}{2^n-1}\cdot L_{max};\ \frac{2}{2^n-1}\cdot L_{max};\ \dots\ ;\ \frac{2^{n-2}}{2^n-1}\cdot L_{max};\ 1\cdot L_{max}$$

$L_{max}$ is the luminance of the cell when the latter is excited continuously, that is to say during all the sub-periods.

The eye of the observer will integrate, over the duration of the image period T, the various combinations of luminous emissions and in this way recreate the various shades in the grey levels. The lowest luminance level which this method enables us to restore is the value $L_{min}=L_{max}/2^n-1$. This elementary value of luminance depends on the maximum value of the luminance ($L_{max}$) given by the technology of the plasma panel but also on the definition of the video (n). The restoring of the video images may in some cases require high luminance, and in other cases high resolution in the low luminance levels, as is the case in television.

The perception of the grey levels by the observer is characterized by the ratio ΔL/L referred to as the Weber-Fechner ratio which defines the relative variations in luminance which the eye of the observer can perceive as a function of the luminance values. The way in which this ratio alters as a function of luminance is given in FIG. 1. The abscissa axis represents the logarithmic value of the luminance in cd/$M^2$ and the ordinate axis the logarithmic value of the relative variation in this luminance. This curve is dependent on a parameter, namely the background luminance or ambient luminance, the luminous environment influencing the sensitivity of the eye. For example, the subjective black limit, namely the value of luminance below which the eye no longer distinguishes the shades, depends on this surrounding luminance. For the luminance values of a plasma panel, values lying between about 0.1 cd/m2 and 200 cd/m2 and corresponding to the right-hand part of the curve, this curve will be approximated by a straight line with equation:

$$\log(\Delta L/L)=-a.\log(L)+b.$$

b is an increasing function of the background luminance. In television, the assumption is made that the small image is viewed in a fixed-luminance environment.

If, in the equation, the elementary variation in luminance ΔL, that is to say the variation in the grey levels which is perceptible to the eye, is replaced by the elementary variation in the grey levels displayed by the plasma panel, that is to say the minimum coding value permitted by n bits and defined in our system by $L_{min}=L_{max}/2^{n-1}$ (rounded to $L_{max}/2^n$), the straight line 1 of FIG. 2 is obtained, with equation:

$$n=\frac{a-1}{\log 2}\log L+\frac{\log L_{max}-b}{\log 2}.$$

The abscissa carries the logarithm of the luminance L and the ordinate the value n, that is to say the number of bits for coding the video. This curve 1 thus represents, for a given luminance value L, the number of video bits necessary for obtaining a resolution compatible with the minimum perceptible luminance value. This curve depends on the luminous environment (parameter b).

Thus, the number of bits necessary for coding the luminance, so that the latter is compatible with the luminance variations perceptible to the eye, increases as the luminance to be displayed decreases. Alternatively, in order to be adapted to the possible differentiation by the eye of two neighbouring grey levels, the lower the luminance level displayed, the higher must be the number of bits for coding the video.

This curve 1 corresponds to a luminous environment of greater than 200 lux, that is to say the observation of an image in a strongly lit room. The definition of the video can then be limited, without the quality of the image being overly degraded thereby, which degradation is all the weaker (subjective perception) when the images display very different areas of luminance.

In the case of a relatively weak luminous environment, for example less than 100 lux, curve 1 moves towards curve 2 (b decreasing). The number of bits for coding the video which makes it possible to differentiate all the grey levels then varies between 16 bits for luminance values of $10^{-1}$ cd/m2 and 12 bits for luminance values of 1 cd/m2. The 8 bits or 10 bits for coding the video become insufficient for good restoration of low luminances. The displaying of a video image coded on 8 or 10 bits gives rise to a lack of details in the image or to black areas in those places where a cathode-ray tube would display weak but non-zero luminances. This phenomenon is particularly striking in respect of scenes exhibiting uniformly dark images.

The purpose of the present invention is to alleviate the abovementioned drawbacks.

SUMMARY OF THE INVENTION

To this end, the subject of the invention is a process for scanning cells of a matrix-controlled display for the displaying of grey levels of a video signal, the scan being split up into sub-scans relating to each bit of column control words, characterized in that the video signal is coded on a number of bits greater, by the value p, than the number of sub-scans of the display so as to deliver video coding words, in that an estimate of the contents of the image is made by determining, on a complete image, the number of times for which each of the first p most significant bits (MSB) of the video coding words takes the value one, in that, if these numbers are greater than or equal to specified thresholds, the p least significant bits of the video coding word are ignored in order to perform the coding of the column control words on the basis of the video coding words and, in the case in which this number is less, the p most significant bits are ignored for this coding and the sub-scan relating to these bits and for this image is assigned to the displaying of the item relating to the p least significant bits.

The subject is also a device for scanning a matrix-controlled display comprising a video processing circuit receiving a video signal and delivering video coding words, a scan management circuit linked to the processing circuit, to line supply circuits for selecting lines and to column supply circuits for controlling the columns of the display on the basis of column control words, the scan of a video image consisting of a succession of p sub-scans dependent on the weights of the bits of the column control words, characterized in that the number of bits of the video coding words is greater by a value p than the number of sub-scans s controlled by the scan management circuit, in that the video processing circuit estimates the contents of each image so as to determine the number of one values of each bit from among the p most significant bits of the video coding words for a complete image, in that the scan management circuit controls the transmission to the column control circuits, in a specified order, of the s most significant bits or of the s least significant bits of the video coding words depending on the number of one values and in that, in the latter case the scan management circuit controls the line supply circuit so that it replaces the p sub-scans assigned to the most significant bits (b7) by p sub-scans corresponding to the p least significant bits (b−1).

According to the invention, in the case of an image defined by coding words which do not activate the most significant bit, the processing sub-scan relating to this most significant bit, which has no influence on the rendition of the luminance of the image, is allocated to the displaying of an additional item which corresponds to a bit of lower weight than the smallest weight as defined in a conventional scan of a plasma panel, according to the prior art. To do this, the video signal received at the input of the device exploits this item or else a transcoding of the video signal on a number of bits greater than the number of sub-scans is performed.

The restoration of low luminances is improved without it being necessary to increase the number of sub-scans, this latter solution being in any event limited by hardware constraints.

BRIEF DESCRIPTION OF THE DRAWINGS

Other features and advantages of the invention will emerge clearly in the following description given by way of non-limiting example and given in conjunction with the appended figures which represent.

DETAILED DESCRIPTION OF PREFERRED EMBODIMENTS

Let us firstly recall the procedures for addressing the cells of a plasma panel.

The method of generating half-tones by temporal modulation requires n accesses to each pixel (or cell) over the duration of a frame, thus entailing storage of the video information during the frame. The screen addressing sequence begins by selecting a complete line by means of 2 high-voltage pulses generated by an amplifier and applied to the electrode by way of the line supply circuit. The first pulse erases the entire line and the second prepositions writing. The pixels of the selected line are addressed simultaneously by a signal emanating from the column supply circuits. These circuits are preloaded with an item originating from an image memory and address the column electrodes either with a high-voltage signal masking the write pulse, or with a ground signal, depending on the preloaded video item. This item consists of a single one of the bits for coding the pixel, the other bits being processed at other instants in the frame. Hereinafter, the collection of bits is referred to as the column control word. The lighting up of the pixel is therefore conditioned by the difference of the voltages applied to the terminals of its cell. This state, unlit or lit, is then sustained by an a.c. signal common to all the cells of the panel until a new addressing of this line (memory effect).

The scanning of a plasma panel requires, in all, n accesses to each pixel over the duration of a frame. Hence, the scanning of the panel quickly becomes complex since each line of the screen must be addressed n times, each time according to the procedure described earlier. The relation which links the various parameters of the addressing of a plasma panel, the number of lines of the image displayed N1, the time for addressing a line tad, and the number of scans of the screen n with the image period T is as follows:

$$T \geqq n \cdot N_1 \cdot t_{ad}$$

The total scanning of a plasma panel therefore consists of n sequences for addressing Nl lines. We define n sub-scans, each of these sub-scans being dedicated to the processing of one of the bits for coding the video or more precisely the column control words.

Figure 1:
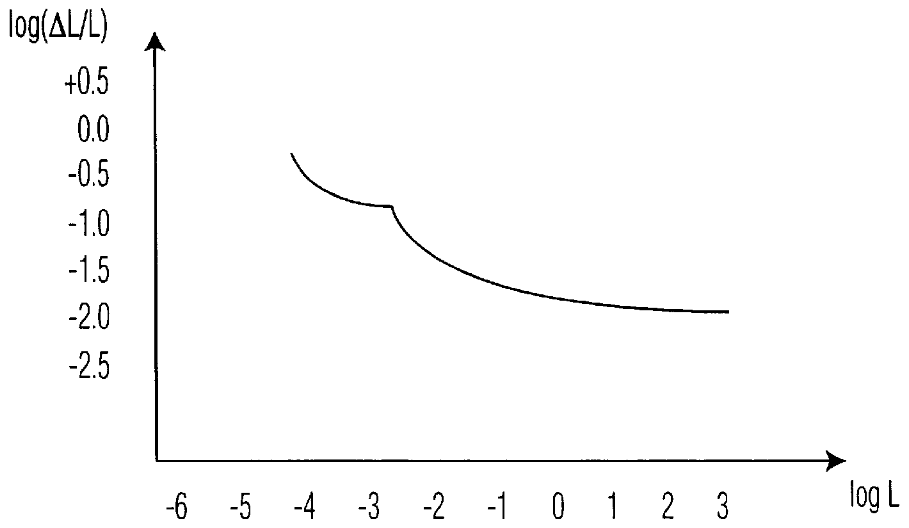
FIG. 1 PRIOR ART
FIG. 1 illustrates a curve of perception of luminance differences by the eye as a function of luminance.
Figure 2:
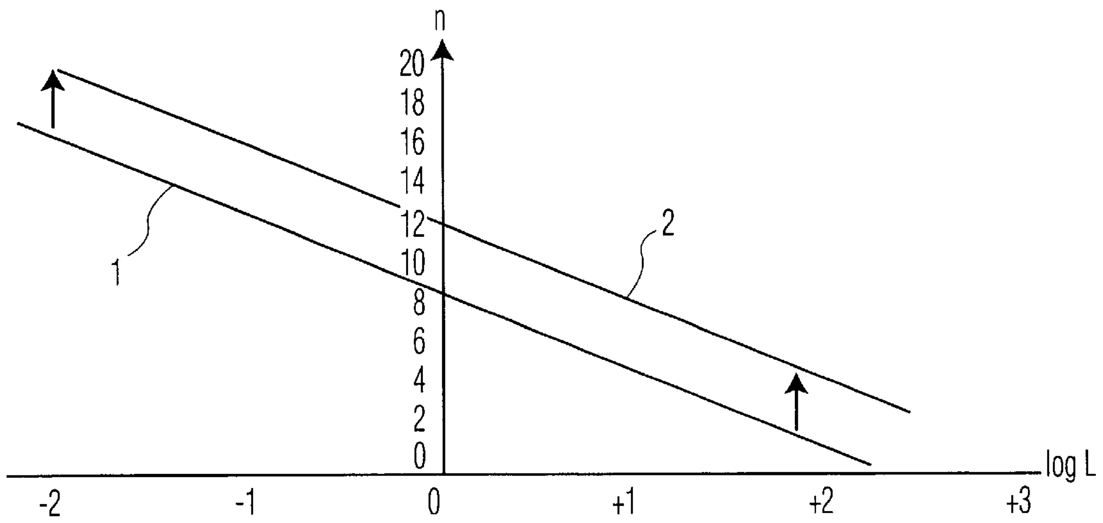
FIG. 2 illustrates a curve defining the necessary number of bits for coding the video as a function of luminance for two values of ambient luminance.
Figure 3:
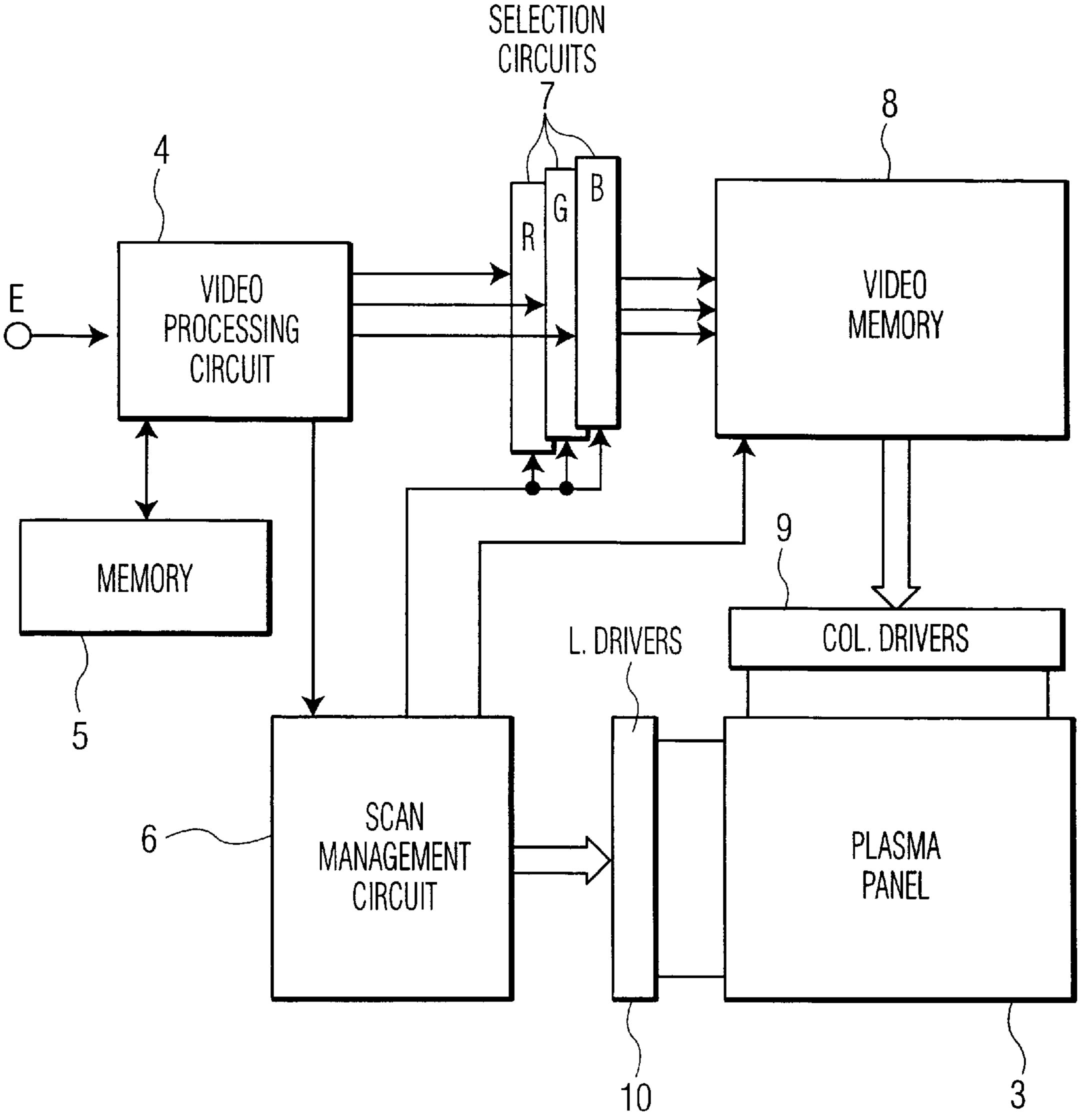
FIG. 3 illustrates a device for implementing the invention.

FIG. 3 represents the architecture of the device implementing the process according to the invention. This is a simplified diagram of the control circuits of a plasma panel 3.

The digital video information arrives on the input E of the device which is also the input of a video processing circuit 4. This circuit is linked to a correspondence memory 5 and to a scan management circuit 6. It is also linked to three identical selection circuits 7 which will transmit selected bits to a video memory 8. This memory is linked to the inputs of a circuit 9 which groups together the column supply circuits of the plasma panel. The scan management circuit 6 transmits selection information to the selection circuits 7 and control information to the video memory 8. It also controls a circuit 10 which groups together the line supply circuits of the plasma panel.

The video information received on the input E of the device is digital information regarding grey levels of a video signal. The plasma panel and the control circuits are configured, in this example, to receive video signals, referred to as column control signals, coded on 8 bits (n=8), that is to say for 8 sub-scans. Still in this example, the grey levels of the R, G, B (red, green, blue) components of the video signal which are received by the device are words of 9 bits.

The 9-bit video data received by the processing circuit are transcoded here over the same number of bits so as to deliver video coding words. This transcoding corresponding to a gamma correction is carried out in a known manner by way of correspondence or look-up tables (or memories) 5.

The contents of the image are estimated by the processing circuit 4 which carries out continuous monitoring of the most significant bit or MSB of the video coding words for the coding of the colours.

This information relating to the MSBs, when a complete image has been received, is transmitted by the processing circuit to the scan management circuit 6, and, via this circuit, to the selection circuits 7.

In the case in which the image described exhibits areas of luminance (colour level for each of the colours) greater than or equal to $L_{max}/2$, that is to say in the case in which MSBs of the video coding words, for a complete image, are activated, the video information is displayed on the plasma panel in the conventional manner on the basis of the 8-bit column control words, labelled b0 to b7 and corresponding to the 8 MSBs of the video coding words, hence ignoring the least significant bit.

In the case in which the image described does not exhibit any area of luminance greater than or equal to $L_{max}/2$, that is to say in the case in which the MSBs of the video coding words are not activated, the sub-scan corresponding to the high-order bit is allocated to the processing of the least significant bit or LSB of the 9-bit video coding word. The 8-bit column control words, labelled b0, b1 . . . b6, b−1, correspond to the 8 LSBs of the video coding words, b−1 corresponding to the least significant bit. This label b−1 on account of the lower weight than that of the LSB of the 8-bit video coding word utilized during a conventional scan (b0 to b7).

To do this, the video coding words are sent, via the processing circuit, to three identical selection circuits 7 corresponding to the three colours. If, after receiving the information relating to a complete image, the processing circuit has not detected any switching of the MSB to one, the 8 least significant bits are selected. In the contrary case, it is the least significant bit which is abandoned, the 8 most significant bits being selected. The memory 8 will therefore store words of 8 bits relating to the coding of the three colours. The successive bits of the column control words corresponding to the various sub-scans are then transmitted by the video memory to the column supply circuits 9, by way of a bus and in synchronism with the line scan. Bit b−1, when stored, is transmitted instead of bit b7, that is to say during the scan corresponding to b7.

The scan management circuit 6 controls, for the duration of a frame and by way of the line supply circuits 10, eight sub-scans of the screen, each sub-scan corresponding to a bit of specified weight of the column control word. The management of these sub-scans is dependent on the information originating from the processing circuit and relating to the MSBs and is made explicit later.

The supply circuit 10 delivers the addressing voltage and also the holding voltage for the duration corresponding to the weight of the bit sent on the columns during this addressing. This voltage is therefore dependent on the information relating to the MSBs and originating from the scan management circuit 6.

Figure 4:
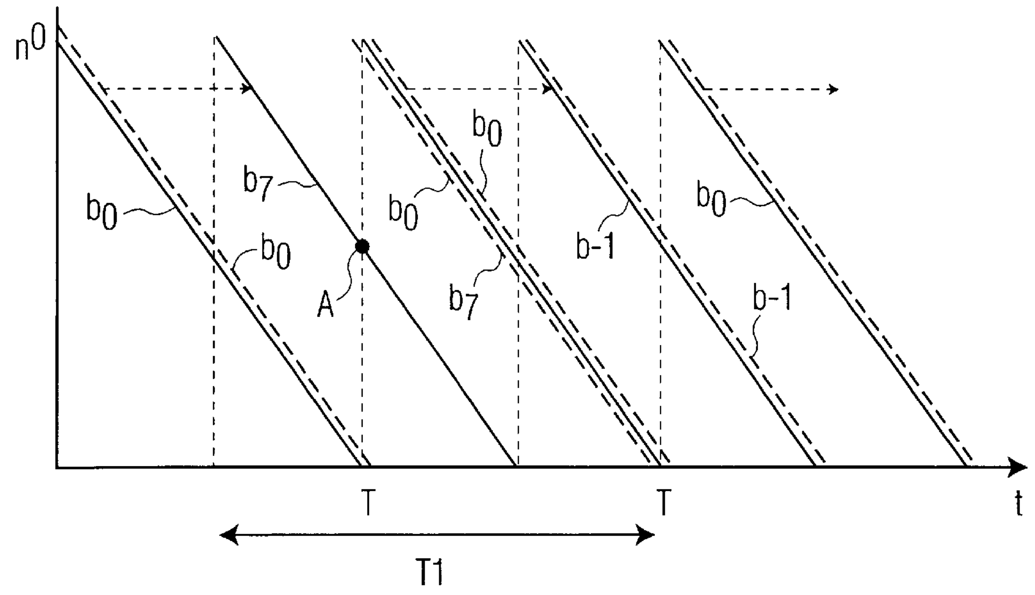
FIG. 4 illustrates a line as a function of time scanning diagram.

The switch from one scan to the other cannot be performed at just any moment, lest the luminous contents of the image be modified. FIG. 4 represents a change of scan for a switch from a standard scan using bit b7, that is to say the MSB, to a scan using bit b−1. The abscissa axis carries the time. The ordinate axis corresponds to the line numbers, increasing downwards. The principle of scanning is based on the simultaneous addressing and scanning algorithm known by the initials SAS. The solid oblique lines represent the scanning of bits b0 to b7 (only the extremes b0 and b7 are drawn) and then, during the following period, the scanning of bits b0 to b−1. The dashed oblique lines correspond to erasure relating to bits b0 to b7 (only the extremes are drawn) for the first image period and b0 to b−1 for the next (it would be possible to reason in the same way with regard to the frame period).

T represents the image period, T1 represents the duration of scanning corresponding to restoration of luminances greater than or equal to $L_{max}/2$ (first line writing up to last line erasure for bit b7).

The sub-scans relating to b7 and b−1 for the column control words corresponding to a new image (frame) can be swapped over only when all the lines of the panel have been processed by bit b7 of the column control words of the previous image. In FIG. 4, the start of the writing of bit b−1 on the first line corresponds to the end of the writing of bit b7 on the last line. The same would hold for a reverse transition of scanning in which the writing of bit b−1 for the first line can only be performed after writing bit b7 for the last line, that is to say when all the lines of the panel have been processed by bit b7.

The swap from one type of scan to another must be performed by a transition scan so as not to break the continuity of the scanning of a bit of the column control word and hence not to display false luminances. Thus, for example, a change of scan from type b7 (that is to say including a b7 sub-scan) to b−1 corresponding to a switch from a previous image having luminance values greater than the mean coding value to a current image which has not caused the MSB to toggle is carried out at the start of the registering of bit b0 of this new current image. Now, the instant of registering this bit for the first few lines corresponds to the instant of registering bit b7 for the mid-screen lines (point A in the figure). Utilizing a scan of type b−1 would affect the end of the scan (bottom part of the screen) for bit b7 by allocating it a holding duration corresponding to a bit b−1 rather than to a bit b7, characteristic of the scan for this new current image or would quite simply interrupt this sub-scan.

Figure 5:
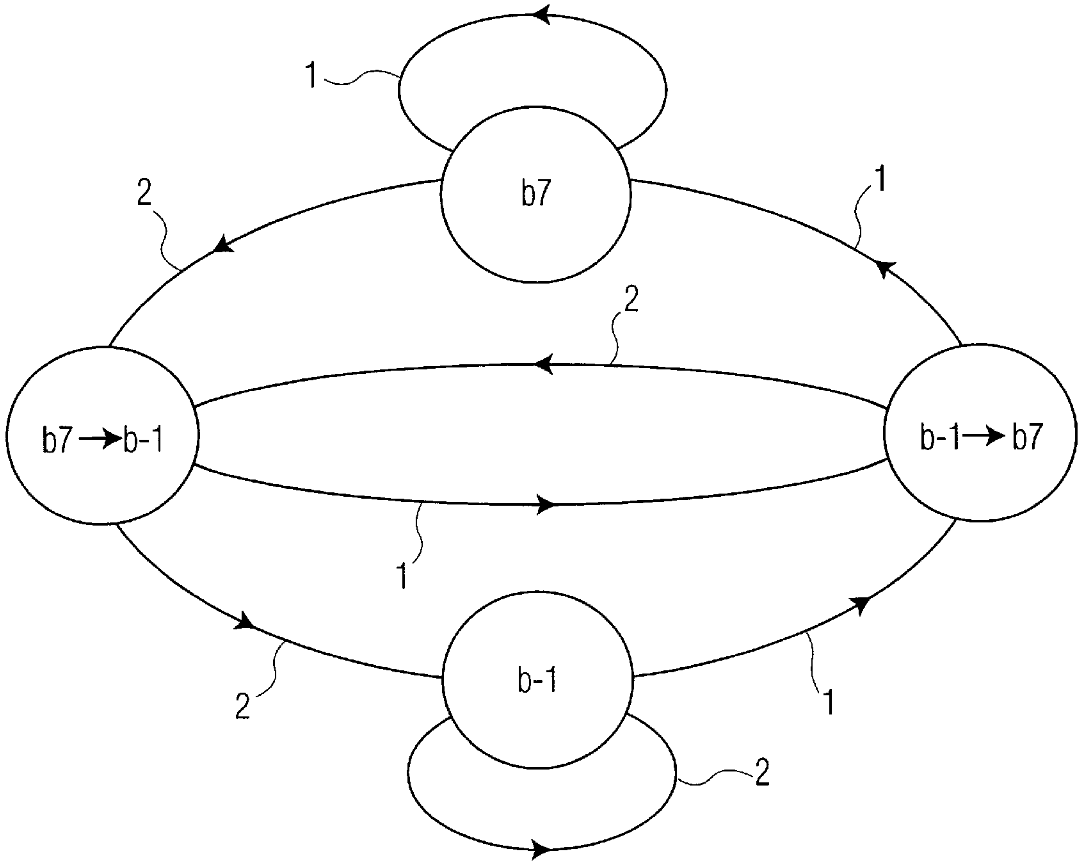
FIG. 5 illustrates a switchover diagram for the various types of scanning.

The sequencing of the scans implementing these transition scans is represented by the Pétri network of FIG. 5. The sequencing is carried out software-wise by the scan management circuit 6.

The circles represent the various types of scan of the plasma panel. Thus, the circles marked with the labels b7 or b−1 correspond to the scan of type b7 or of type b−1 with a preceding scan of the same type, the circles marked b7 towards b−1 or b−1 towards b7 correspond to the transition scans, that is to say to a scan of type b−1 following a scan of type b−7 or a scan of type b7 after a scan of type b−1.

Starting from a given type of scan for a current image, the following scan is effected as a function of the detection or otherwise of an MSB at one in the following image.

In FIG. 5, the following type of scan is determined by the outgoing arrow assigned the number corresponding to the condition fulfilled:

condition 1: detection of a MSB at one for the image following the current image;

condition 2: no detection of MSB at one for the image following the current image.

As seen earlier, the transition scan controls the lines of the plasma panel, for the current frame or image, differently from the preceding frame or image, this modification being carried out by the scan management circuit. In particular, when initiating the transition scan for the displaying of the new image and starting with the sub-scan corresponding to bit b0, the preceding sub-scan corresponding to bit b7 (respectively b−1) is brought to its conclusion without modifying the holding duration for which the cells are lit. This duration is modified by the management circuit and adapted to bit b−1 (respectively b7) for the scan of the new image only after the sub-scan of all the lines of the image for bit b7 (respectively b−1).

Estimation of the contents of the complete image by the processing circuit before the selection and transmission of the video coding words of this image requires that this image be stored by the processing circuit which therefore includes a memory for such storage. This analysis relating to the estimation of the contents over a complete frame (interlaced scan) or complete image (progressive scan) can also be performed by ancillary processing circuits upstream of the device described. The video data may then be displayed without it being necessary to carry out a new check on the image or frame in order to determine the maximum value of the luminance relating to this image or frame.

The device described previously comprises a processing circuit 4 and separate selection circuits 7. These latter circuits may of course, without departing from the field of the invention, be integrated with the processing circuit 4 which then provides the 8-bit video coding words directly. An equally conceivable solution consists in not using the selection circuit 7 for the calculation of the column control words but in carrying out the selection of the bits on the basis of the video memory 8. The video coding words are transmitted directly to the video memory and the scan management circuit then controls this video memory as a function of the information received by the processing circuit. It controls the reading of just the MSBs or LSBs of the video coding words stored as a function of the contents of the image and in the appropriate order.

In this case, the video memory capacity must be larger but it is then no longer necessary for the processing circuit to comprise circuits for storing the image, the storing of the video coding words being performed by the video memory 8, this possibly being very advantageous when such storage circuits are not otherwise necessary, that is to say for the implementation of the ancillary functions undertaken by the processing circuit (processing of the image).

The invention has been described within the context of a swap of two sub-scans. It can be extended to p sub-scans. Thus, in an image in which the first p high-order bits are simultaneously non-activated, it is possible to use these p sub-scans to increase the definition of the video via the sub-scans relating to bits b−1 to b−p.

Likewise, according to the invention, it is verified with regard to a complete image that the MSB never takes the value one. It is also possible to permit a minimum number, over an image, of one values for this MSB, for the implementation of the sub-scan of type b−1, the condition on this number being that the overall quality of the image (subjective perception) be improved.

The video coding words have been described as originating from a straightforward gamma correction transcoding of the video information received, requiring, so that the number of bits is greater than the number of sub-scans, video information coded on 9 bits. It is also conceivable for this condition concerning the number of bits to be fulfilled by any type of transcoding of the video information received into video coding words which increases the number of coding bits, for example transcoding which distributes the weight of the MSBs or utilizes notation other than to the base two, the combining of such transcodings with the invention as described earlier being particularly advantageous.

The base two notation coding of a video image utilizes, let us say in more than 80% of cases, the most significant bit. A transcoding making it possible to obtain video coding words for which the weights of the MSBs are lower makes it possible to reduce this percentage and hence to improve the quality of the image. According to the current characteristics of plasma panels, the number of possible sub-scans is 10. The video is generally coded from 0 to 255 on 8 bits. Two additional sub-scans are therefore available and transcodings such as the utilization of notation other than to the base two or the distributing of the weights over several bits can be used in the majority of cases.

Moreover, a greater freedom of transcoding can be afforded by the implementing of addressing which is common to lines 2n and 2n+1 for a bit with a specified weight, thus increasing the number of sub-scans as indicated further on.

Let us give a few non-limiting examples of combinations of various types of coding and of scanning.

A transcoding of the 8-bit word for coding a video into a 10-bit coding word supplying the columns, the column control word, is known from the prior art. This transcoding splits each of the two high-order bits of value 64 and 128 respectively into two sub-scans of weight 32 (of type b6 and b7) and two sub-scans of weight 64 (of type b8 and b9). Thus, the coding of the value 128 is performed by giving the value 1 to the two sub-scans of weight 64 of the column control word, thus distributing the load of the line supply circuit over the duration of the frame and thereby reducing the effects of highlighting.

This transcoding can be combined, efficiently, with the invention described earlier. In the example given, the video information is coded on 9 bits allocating the weight 256 to the MSB for a luminance coding between 0 and 511. These words are transcoded, according to the prior art described earlier, into 11-bit words, the weight of the MSB being distributed over two bits, each having a half weight, namely 128. By carrying out this transcoding in such a way that the MSB is used only for the coding of the values lying between 511 and 511−128, the values lying between 256 and 256+128 being coded by the other bit of weight 128, the switching of the MSB to the value one corresponds to the passing of the luminance above the threshold of $L_{max}-L_{max}/4$, corresponding to a coding of the luminance values greater than 383. The selection circuits choose the 10 MSBs or the 10 LSBs according to whether this most significant bit switches to 1 or otherwise.

The monitoring of the switching to one of the MSB on the word thus transcoded rather than on the 9-bit video coding word significantly improves the probability of accomplishing sub-scan b−1 (instead of sub-scan b9) and consequently the quality of the image.

Other preferred embodiments combine the above process with coding and scanning modes for plasma panels described in the French Patent Application filed on Apr. 25, 1997 under National Registration No. 97 05166 and entitled "procédé et dispositif d'adressage pour panneau à plasma basé sur une répétition de bits sur une ou plusieurs lignes" (Plasma panel addressing process and device based on repeating bits on one or more lines).

The text below is borrowed from this patent application.

The process described hereafter makes it possible to "free" sub-scans so as to perform this temporal distribution of the codes very efficiently in order to limit the "contouring" effects. This process consists in copying a bit from line 2n onto line 2n+1 by carrying out a common addressing between lines 2n and 2n+1 in respect of the relevant bit. Alternatively, it consists in using the same addressing time for the relevant bit, for lines 2n and 2n+1 and exciting or not exciting, depending on the value of this bit, the two corresponding cells.

On referring to the relation:

$$T \geqq n.N_1.t_{ad}$$

it may be observed that by carrying out such addressing, that is to say by decreasing Nl, it is possible to increase the value of n. The term tad is a hardware-related constraint.

Let us take an example:

Given a panel with 512 lines and 10 addressings for each line, 5120 addressings must be carried out during a frame.

If lines 2n and 2n+1 are addressed in common in respect of a particular bit, we shall have:

512×9+(512/2)=4864 addressings, i.e. 256 fewer addressings.

If this operation is repeated a second time while copying a second bit, we shall have:

512×8+(512/2)=4608 addressings, i.e. 512 fewer addressings.

This therefore allows us the possibility of adding an extra addressing for all the lines.

By copying two bits from lines 2n to lines 2n+1, it is possible to perform 11 addressings for each line rather than 10. By extrapolating, copying 2*i bits provides a saving of i addressings per line.

The principle of copying a bit from one line onto the other can be performed on any bit whatsoever. However, it is more sensible to do it on the bits of low weight insofar as statistically the copying of a bit leads to an error in 50% of cases (fewer if the correlation existing between the video of line 2n and that of line 2n+1 is taken into account). The lower the weight, the smaller will be the error induced.

An example of an application is given below:

Let us again use the above code: 1 2 4 8 16 32 32 32 64 64.

If we copy the 4 low-order bits (1 2 4 8) we shall benefit from 2 extra bits. These bits can then be used to decrease the weight of the MSBs using the following code:

1(2n=2n+1) 2(2n=2n+1) 4(2n=2n+1) 8(2n=2n+1) 16 32 32 32 32 32 32 32.

It is thus possible to divide the weights of 64 by 2 and thus obtain only weights of 32 or less. Since the phenomenon of contouring appears during the switching over of the high weights, it will be greatly attenuated in this way.

The technique described above may lead to systematic errors when copying the bits. It is possible to minimize these errors by combining this technique with a rotating-code addressing process described below. The contour and highlighting problems can be simultaneously lessened using this combination.

The basic idea of rotating-code addressing consists in employing a larger number of bits than that necessary for coding the video (8 bits to code 256 levels), for example 10 bits, and in utilizing these bits to code the 256 levels of the digital video signal, not in base two notation, but in a special notation. This is because, with the power of 2 code, it is possible to obtain only a single combination of bits for a given value to be coded. By contrast, a code can be chosen whose successive weights do not follow this geometric progression with common ratio 2 and which allows several combinations for the coding of one and the same value.

An example of a code which assigns a weight other than a power of 2 to some of the bits of the binary coding word could for example consist of the following string of values:

1 2 4 8 14 24 33 41 56 72, the sum of all these weights (corresponding to place values 1 to 10 of the binary coding word) still being 255.

Thus, for this code, for example the value 100 can be described in different ways:

$$\begin{aligned} 100 &= 72 + 24 + 4 \\ &= 72 + 14 + 8 + 4 + 2 \\ &= 56 + 41 + 2 + 1 \\ &= 56 + 33 + 8 + 2 + 1 \\ &= 56 + 24 + 14 + 4 + 2 \\ &= 41 + 33 + 24 + 2 \\ &= 41 + 33 + 14 + 8 + 4 \end{aligned}$$

This gives 7 different codes for the same value. Since the addressing of these 10 sub-scans is spread over the 20 ms of the frame, it will therefore be possible, depending on the code chosen, to distribute the load equitably between the various codes, and to change the code from one pixel to another of the same line for one and the same value of grey level.

The bit-repetition addressing process makes it possible to benefit from extra bits in order to distribute the weight of the MSBs if information is copied from line 2n to line 2n+1. The rotating-code addressing process, which requires extra bits, affords us several coding possibilities for a given video value.

A combination of the two processes makes it possible to improve the efficiency of each of them and very greatly to lessen the aforementioned drawbacks. Thus, the bits can be copied between lines 2n and 2n+3 as a function of the contents of the video, rather than systematically. The copied bits are then chosen in such a way as to minimize the errors introduced by this copying.

A first example is given below.

Let us start from the result, namely that there are 12 bits with which to code the video. These 12 bits mean that there must be 4 bits in common between lines 2n and 2n+1. Let us take the following 12-bit code:

1 2 4 6 10 14 18 24 32 40 48 56.

From these 12 bits 4 bits are chosen which will be common to lines 2n and 2n+1, i.e. for example the bits: 24 14 6 2.

The principle of rotating-code addressing consists in coding lines 2n and 2n+1 in such a way as to obtain the same states for the 4 chosen bits.

Suppose the value 34 is to be coded in line 2n and the value 54 in line 2n+1. The values of the common bits with weights 24, 14, 6, 2 are given in brackets.

$$\begin{aligned} 34 &= 32 + 2 \quad (0001) \\ &\phantom{=} 24 + 6 + 4 \quad (1010) \\ &\phantom{=} 24 + 10 \quad (1000) \\ &\phantom{=} 18 + 10 + 6 \quad (0010) \\ &\phantom{=} 18 + 14 + 2 \quad (0101) \\ &\phantom{=} 18 + 10 + 4 + 2 \quad (0001) \\ &\phantom{=} 14 + 10 + 6 + 4 \quad (0110) \end{aligned}$$

-continued

54 = 48 + 6 (0010)
48 + 4 + 2 (0001)
40 + 14 (0100)
40 + 10 + 4 (0000)
32 + 18 + 4 (0000)
34 + 14 + 6 + 2 (0111)
32 + 10 + 6 + 4 + 2 (0011)
24 + 18 + 10 + 2 (1001)
24 + 18 + 6 + 4 + 2 (1011)
24 + 14 + 10 + 6 (1110)
24 + 14 + 10 + 4 + 2 (1101)
18 + 14 + 10 + 4 + 2 (0111)

The various coding possibilities whereby the four common bits may be identical are:

(32+2) (0001) and (48+4+2) (0001)

or (18+10+4+2) (0001) and (48+4+2) (0001)

or (18+10+6) (0010) and (48+6) (0010).

It is therefore possible in this case to find a pair of codes (here 3 pairs) which are suitable, that is to say for which the rotating-code addressing will then lead to no error.

A second example, the coding of the value 34 for line 2n and the value 32 for line 2n+1 is given below.

The various coding possibilities are:

34 = 32 + 2 (0001)
24 + 6 + 4 (1010)
24 + 10 (1000)
18 + 10 + 6 (0010)
18 + 14 + 2 (0101)
18 + 10 + 4 + 2 (0001)
14 + 10 + 6 + 4 (0110)

32 = 32 (0000)
24 + 6 + 2 (1011)
18 + 14 (0100)
18 + 10 + 4 (0000)
14 + 10 + 6 + 2 (0111)

When there is no coding possibility for obtaining the four common bits identical, the aim will be to find the pair of codes which is closest to a possible combination. In this case the pair 33 (0000) and 32 (0000) will be adopted, i.e. an error of 1 LSB. The error will therefore no longer be systematic and with amplitude proportional to the number of bits copied, but dependent on the 2 video levels and the bigger the discrepancy between the two terms, the bigger it will be.

Statistically in our example, it will be possible to code more than 90% of the pairs without errors. For the remaining 10%, the aim will be to minimize the error as a function of the respective levels of the video.

When there are several coding possibilities, an advantageous solution consists in selecting the words or pairs of words which possess the most 1 bits and, from these words, that or the pair whose high-order 1 bit has the least weight, while considering the lower high-order bits if there is equality.

By virtue of this selection:

the load of the supply circuit is distributed over a maximum number of bits, thus reducing the highlighting effects;

the switchovers of the bits with high weight are minimized thus reducing the contouring effects.

The hardware construction of the device is also simplified as compared with that based on choosing randomly from the coding possibilities when distributing the line supply circuit's load.

In the example given earlier relating to the coding of the value 34 for one line and the value 54 for the following line, the pair:

18+10+4+2 and 48+4+2 will thus be chosen from the three coding possibilities.

The description given above, extracted from the aforementioned patent application, therefore sets out the utilization of coding words whose bits of high weight have a value less than $L_{max}/2$. It is thus possible, by virtue of the implementation of these coding processes, to increase the probability of non-switchover of the most significant bit and therefore of accomplishing the substitution scan relating to the bit referred to as b−1 in our invention.

The selecting of two consecutive lines for the coding of a bit with a specified weight makes it possible to "free" sub-scans permitting coding over a still larger number of bits.

Combining the bit-repetition addressing process or the rotating-code addressing process with the process according to the above-described invention or the three processes makes it possible to optimize our invention by improving the quality of the image through better definition of the luminance levels, whilst also reducing the contouring and highlighting effects.

The applications of the invention relate to matrix-controlled display devices using the principle of temporal modulation for the generation of half-tones, especially plasma panels of the a.c. type with memory or d.c. type with memory.

What is claimed is:

1. A process for scanning cells of a matrix-controlled display for displaying grey levels of a video signal, a scan including sub-scans relating to bits of column control words, the process comprising:

coding the video signal on a number of bits greater, by a value p, than the number of sub-scans to deliver video coding words; and, estimating the contents of an image by determining, on the complete image, a number of times for which each of the first p most significant bits (MSB) of the video coding words takes the value "one";

wherein, if the determined number of times is greater than or equal to at least one specified threshold, the p least significant bits of at least one of the video coding words are ignored in the course of coding the column control words, and in the case in which the determined number of times is less than the specified threshold, the p most significant bits are ignored in the course of coding the column control words, and a corresponding one of the sub-scans relating to said p most significant bits and for said image is assigned to the displaying of an item relating to the p least significant bits.

2. The process according to claim 1, wherein at least one of the specified threshold is the value one.

3. The process according to claim 1, wherein the value of p is one.

4. The process according to claim 1, wherein the coding on a number of bits greater than the number of sub-scans is at least carried out by performing a transcoding of the video signal into video coding words by utilizing notation other than to the base two.

5. The process according to claim 1, wherein the coding on a number of bits greater than the number of sub-scans comprises transcoding the video signal into video coding words by distributing a weight of at least one most significant bit over at least two bits.

6. The process according to claim 4, wherein different column control words are used for coding a same grey level of the video signal.

7. The process according to claim 5, wherein different column control words are used for coding a same grey level of the video signal.

8. The process according to claim 1, further comprising simultaneously selecting two successive lines during a sub-scan relating to a low-order bit of a column control word relating to one of the two lines.

9. The process according to claim 1, wherein the video signal comprises red, green and blue components.

10. The process according to claim 8, wherein the video signal coding includes a gamma correction.

11. The process according to claim 1, wherein the matrix-controlled display is a plasma panel.

12. A device for scanning a matrix-controlled display comprising:

a video processing circuit for receiving a video signal and delivering video coding words;

a scan management circuit linked to the video processing circuit, to line driver circuits for selecting lines and to column driver circuits for controlling columns of the display on the basis of column control words, a scan of a video image comprising:

a succession of s sub-scans dependent on the weights of the bits of the column control words, wherein the number of bits of the video coding words is greater by a value p than the number of sub-scans s controlled by the scan management circuit wherein, the video processing circuit operative for estimates the contents of each image so as to determine the number of "one" values of each bit from among the p most significant bits of the video coding words for a complete image, wherein the scan management circuit controls the transmission to the column driver circuits, in a specified order, of the s most significant bits or of the s least significant bits of the video coding words depending on the number of "one" values and wherein, in the latter case the scan management circuit controls the line driver circuit so that it replaces the sub-scans assigned to the most significant bits by sub-scans corresponding to the p least significant bits.

13. The scanning device according to claim 12, wherein the transmission of the s most significant or least significant bits is performed by way of selection circuits linked to a video memory and controlled by the scan management circuit, the selection circuits receiving the video coding words and the video memory transmitting the column control words to the column driver circuit.

14. The scanning device according to claim 12, wherein the transmission, according to a specified order, of the s most significant or least significant bits is performed by way of a video memory receiving the video coding words from the processing circuit and transmitting the column control words to the column driver circuits, the memory controlled by the scan management circuit.

15. The device according to claim 12, wherein a number of switchovers taken into account for each of the most significant bits by the processing circuit is the value one.

16. The device according to claim 12, wherein the processing circuit transcodes the video signal so as to deliver the video coding words.

17. The device according to claim 12, wherein the matrix-controlled display is a plasma panel.

18. A process for performing a plurality of scans of a matrix-controlled display, for displaying a video signal using a plurality of visual-levels, said video signal including a plurality of images, and each of the scans including n sub-scans each relating to a bit of a plurality of column control words, the process comprising:

coding the video signal using an n+p number of bits so as to generate a plurality of video coding words each having a p number of most significant bits and a n number of least significant bits; and, if one of said images comprises more than a predetermined number of pixels wherein the p most significant bits are not equal to zero, generating the column control words corresponding to said one of said images using the n most significant bits of the video coding words; and, if said image comprises less than said predetermined number of pixels wherein the p most significant bits are not equal to zero, then generating the column control words using the n least significant bits of the video coding words.

* * * * *